United States Patent [19]

Johnsen

[11] 3,995,512
[45] Dec. 7, 1976

[54] SHEATH ANCHOR FOR CABLE CONTROL SYSTEMS
[75] Inventor: Howard H. Johnsen, Dallas, Tex.
[73] Assignee: National Independent Distributor Associates, Inc., Minneapolis, Minn.
[22] Filed: June 11, 1975
[21] Appl. No.: 585,784

Related U.S. Application Data

[63] Continuation of Ser. No. 411,804, Nov. 1, 1973, abandoned.
[52] U.S. Cl. .............................................. 74/501 R
[51] Int. Cl.² ......................................... F16C 1/10
[58] Field of Search ...................... 74/501; 211/126

[56] References Cited
UNITED STATES PATENTS

| | | | |
|---|---|---|---|
| 1,230,422 | 6/1917 | Lyttle | 74/501 |
| 1,951,972 | 3/1934 | Fraser | 211/126 |
| 2,725,669 | 12/1955 | Vincent | 74/501 |
| 3,383,940 | 5/1968 | Brilando et al. | 74/501 |
| 3,546,962 | 12/1970 | Ruhala | 74/501 |

Primary Examiner—Samuel Scott
Assistant Examiner—Wesley S. Ratiff, Jr.
Attorney, Agent, or Firm—Merchant, Gould, Smith, Edell, Welter & Schmidt

[57] ABSTRACT

A generally flat base having a pair of opposed arcuate arms which converge toward each other to form a slot is securable to a frame of a bicycle or the like for anchoring one end of a control cable sheath. The arcuate arms embrace one end of the cable sheath and restrain the sheath against transverse movement. An abutment on the base is engageable by the end of the cable to limit longitudinal movement of the sheath. The abutment has a slot formed therein which opens into the slot formed by the arcuate arms to receive the cable. The slot formed by the arcuate arms is skewed relative to the longitudinal dimension of the cable and the cable must be correspondingly skewed to be received in or removed from the slot in the abutment.

4 Claims, 7 Drawing Figures

U.S. Patent      Dec. 7, 1976      3,995,512
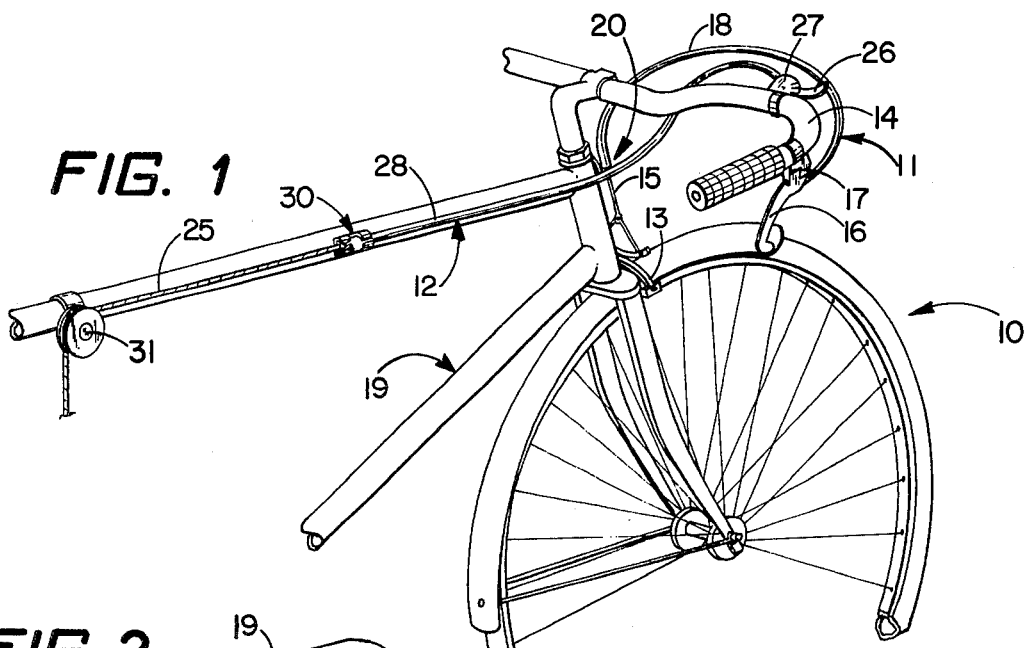
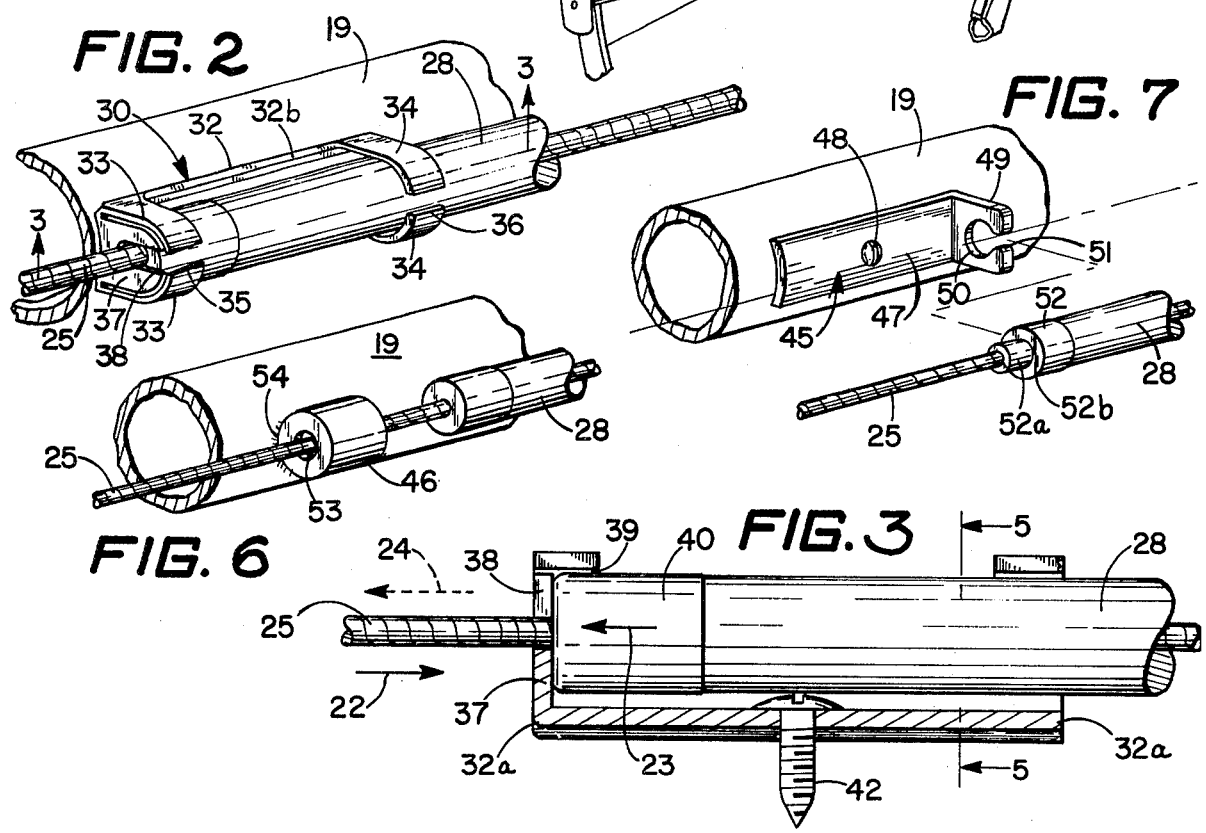
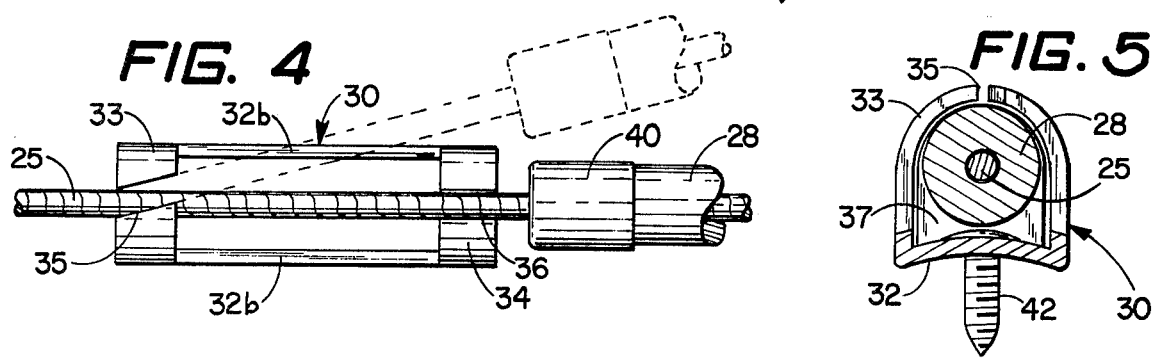

SHEATH ANCHOR FOR CABLE CONTROL SYSTEMS

This is a continuation of application Ser. No. 411,804, filed Nov. 1, 1973, now abandoned.

BACKGROUND OF THE INVENTION

1. Field of the Invention

The present invention relates generally to anchoring devices and more specifically is concerned with anchoring devices for sheaths of pull-type cable control systems for bicycles and the like.

2. Description of the Prior Art

Bicycles generally employ sheathed cable control systems of the pull-type for controlling shifting mechanisms, braking mechanisms, etc. The sheathed cables usually follow a serpentine or curved path between an actuator lever at one end and a device to be controlled at the other end. The actuator lever imparts a pull-type control movement to the cable in one direction from one end of the cable, and a spring bias at the other end of the cable imparts a pull-type or return control movement to the cable from the other end thereof. Under conditions wherein the shifting mechanism, etc., and actuator lever are mounted on relatively movable parts (for example, a bicycle frame and a steering handlebar) so that the cable and sheath must extend along a curved path, it is necessary to anchor one of the opposite ends of a sheath enclosing the cable to each part. When these sheaths and cables extend a relatively long distance (for example between the handlebars and rear brakes or shifting mechanisms) undue frictional engagement between the relatively flexible cable and its enclosing sheath occurs. In addition, kinking, accumulated dirt and misalignment of various parts in the cable control system present further frictional problems. This often results in improper controlling movements of the cable, particularly those applied by the spring bias.

Prior art devices have attempted to overcome this problem by sheathing only the end portions of the cable and leading the intermediate portion thereof over pulleys or the like to direct the cable along its serpentine or curved path of travel. With this modification, anchoring devices must be provided for anchoring ends of the sheath sections which are disposed adjacent the frame of the bicycle, the opposite end being anchored respectively to a controlled device and a controlling device. This allows the proper control movements to be imparted to the flexible cable along curved paths by both the actuator lever and the spring bias. A problem with these anchoring devices has been their inability to securely anchor the adjacent end of the sheath against accidental displacement under all conditions of use while at the same time providing an anchor member which allows for the quick and easy removal of the sheath and cable assembly for reasons of repair or replacement. Also, these anchors have not provided sufficient longitudinal alignment support for the cable and sheath adjacent the anchor resulting in binding movements of the cable through the anchor. No prior art devices have successfully eliminated these problems.

SUMMARY OF THE INVENTION

The present invention provides a sheath anchor for sheathed cable control systems which allows for the easy removal of the sheath and cable assembly therefrom with a minimum of skill and effort. Also, the device of the present invention provides a sheath anchor for sheathed cable control systems which is relatively inexpensive, extremely durable and which positively anchors the sheath under all conditions of use. In this respect, a sheath anchor is provided which includes a base having a pair of arcuate arms which converge toward each other to form a slot. The arcuate arms embrace one end of a cable sheath and restrain the sheath against movement transversely of the longitudinal dimension thereof. An extension of the base is formed at a right angle thereto to provide an abutment which is axially engageable by the end of the sheath. The abutment limits movements of the sheath in one direction when the sheath is embraced by the arcuate arms. The abutment has a slot formed therein which opens into the slot formed by the arcuate arms to receive the cable. The slot formed by the arcuate arms is skewed relative to the longitudinal dimension of the cable whereby the cable must be correspondingly skewed to be received in or removed from the slot in the abutment. The arcuate arms are disposed at one end of the base in a position to embrace the abutment and an additional pair of arcuate arms are disposed adjacent the opposite end of the base. The additional arcuate arms converge toward each other and terminate in a slot which is generally aligned with the longitudinal dimension of the cable. The cable and sheath is removed from the sheath anchor by moving the sheath axially out of engagement with the abutment and of embracing relationship with the arcuate arms, passing the cable transversely through the aligned slot formed by the additional arcuate arms and moving the cable to a skewed position corresponding to the position of the skewed slot for transverse removal from that slot as well.

BRIEF DESCRIPTION OF THE DRAWINGS

FIG. 1 is a fragmentary perspective view of a sheathed cable control system employing a sheath anchor constructed in accordance with the present invention;

FIG. 2 is an enlarged fragmentary view in perspective of the sheath anchor of the present invention;

FIG. 3 is a still further enlarged view in longitudinal section as seen generally from the line 3—3 of FIG. 2;

FIG. 4 is a view of the sheath anchor showing dotted lines the position of the sheath and cable during removal from the anchor;

FIG. 5 is a transverse sectional view as seen from the line 5—5 of FIG. 3; and

FIGS. 6 and 7 are fragmentary views in perspective of prior art sheath anchoring devices.

DESCRIPTION OF THE PREFERRED EMBODIMENT

Referring initially to FIGS. 1–4 of the drawings, the reference numeral 10 generally designates a bicycle employing sheathed pull-type cable control systems 11, 12. These control systems 11, 12 are generally employed for actuating brakes 13 or shifting mechanisms and the like, not shown. As previously described, when these systems 11, 12 must travel over relatively long distances (such as from the handlebars 14 of the bicycle 10 to the brakes or shifting mechanisms at rear wheels, not shown) a center portion of the sheath is removed to reduce frictional engagement of the moving parts of the control system.

In FIG. 1 of the drawings, control system 11 is shown as controlling the front brakes 13 of the bicycle 10. This control system includes a relatively short flexible cable 15. The cable 15 extends along a curved path between and is operatively connected to the front wheel brakes 13 and an actuator lever 16. The actuator lever 16 is mounted on the handlebars 14 by conventional mounting mechanism 17. A sheath 18 encloses the cable 15 and is securely anchored at one end to the mechanism 17 and to the frame 19 of the bicycle 10 at the other end, as at 20. It will be appreciated that the relatively short longitudinal dimension of the control system 11 does not generally present the problem of undue frictional resistance between the control cable 15 and the sheath 18 and thus, the sheath 18 extends for substantially the length of the cable.

However, control system 12 illustrates a system which extends from the handlebars 14 rearwardly to a brake or shifting system, not shown, but which is positioned at the rear of the bicycle 10. The control system 12 extends along a serpentine path substantially longer than that of control system 11. Accordingly, control system 12 includes a cable 25 which extends between an actuating lever 26 (mounted on the handlebars 14 by conventional mounting mechanism 27) and a shifting mechanism associated with the rear wheel, not shown, of the bicycle 10. A sheath 28 extends from the mounting mechanism 27 toward the frame 19 to enclose the cable 25 for a short distance therealong. That is, the sheath 28 extends for a sufficient distance along a curved path to reach a portion of the frame 19 at which the end thereof, remote from the lever 26, may be engaged and anchored in a sheath anchor 30 to be described hereinafter.

Only a portion of the control system 12 is shown, it being understood that a similar sheath 28 is connected at one end to the shifting mechanism, etc. at the rear of the bicycle 10 and the other end thereof is mounted in a sheath anchor similar to sheath anchor 30 illustrated in FIGS. 1 and 4. A sheath and sheath anchor is not needed adjacent the shifting mechanism or rear brakes at the rear of the bicycle 10 except when it is necessary for the cable to negotiate a curved path. However, when one is provided, this sheath portion is constructed and mounted in a similar manner to the sheath 28 and sheath anchor 30 to be described. Therefore, in the interest of brevity, only that portion of the control cable extending between the steering handlebars 14 and along a portion of the frame 19 is shown. The intermediate portion of the cable 25 between the anchors 30 is led over a plurality of pulleys 31 (only one of which is shown) to guide the intermediate portion of the cable 25 between the sheath anchors 30.

As shown, the sheath anchor 30 includes an elongated generally flat base 32 having opposite ends 32a and side edges 32b. Retainer means on the base 32 for the reception of one end of the cable sheath 28 are provided to limit movement of the sheath transversely of the longitudinal dimension thereof. The retainer means is shown as a pair of opposed arcuate arms 33 and an additional pair of arcuate arms 34 correspondingly extending from the base 32. Each pair of arms in the retainer means converge toward each other and terminate in a spaced relationship, to form slots 35, 36 respectively. For a reason which will become apparent hereinafter, the slot 35 is skewed with respect to the longitudinal dimension of the cable 28 and the slot 36 is generally aligned with the longitudinal dimension of the cable 28.

A generally flat extension of the base 32 is formed at a right angle thereto to provide an abutment means 37. The abutment means 37 extends from the base in the same direction as the arms 33, 34, and is formed with a slot 38 which opens outwardly from the base 32. The pairs of arms 33, 34 are disposed adjacent the opposite ends 32a of the base 32. In this manner, arms 33 extend from the side edges 32b of the base 32 so that they embrace the abutment means 37 with the slot 38 opening into the skewed slot 35. This arrangement provides a recess 39 defined by the abutment 37, arms 33 and base 32, which recess opens toward the pair of arms 34 for the reception of the extreme adjacent end of the sheath 28.

Because the cable 25 and sheath 28 follow a curved path, a pulling force exerted on the cable 25 by the actuator lever 26 is accomplished by an opposite reaction force on the sheath 28 (see arrows 22 and 23 respectively of FIG. 3). For this reason, the extreme end of the sheath 28, which normally engages the abutment means 37 within the recess 39, is provided with a metallic fitting 40 to withstand this reaction force without damage to the sheath 28.

As seen particularly in FIG. 3, the base 32 is formed with a central opening 41 for the reception of a fastener 42 which secures the sheath anchor 30 to a fixed surface, such as the frame 19 of the bicycle 10. It will be noted that the transverse cross-sectional shape of the base 32 is slightly arcuate, see FIG. 5. Because the frame 19 is tubular, this correctly aligns the anchor 30 with the cable 25 and sheath 28 when the anchor 30 is mounted on the frame 19 by the single fastener 42.

FIGS. 1–4 illustrate the sheath 28 and sheath anchor 30 in an operative position wherein the cable 25 and sheath 28 are restrained against movements transversely of the longitudinal dimension thereof and the sheath is restrained against movement in one direction indicated by the broken arrow 24 in FIG. 3. As above described, cable control systems for bicycles and the like are of a type which apply only pulling or tensional forces to the cable 28. That is, the force applied by the actuator levers 16, 26 in respective control systems 11, 12 is a pulling or tensional force directed to operate a shifting or brake mechanism connected to the opposite ends of the cables 15, 25. Cables 15, 25 are returned to their original position through the use of springs or the like (not shown) operatively connected to exert a pulling force from the ends of the cables connected to the shifting or brake mechanism. Since the force exerted on the cable 25 by lever 26 is always a pulling or tension force the resulting force exerted on the sheath 28 is always in the direction shown by the arrow 23 in FIG. 3. Thus, it is unnecessary to provide a more complicated and expensive sheath anchoring device which would be constructed to anchor the sheath 28 against movement in both directions longitudinally thereof. This, of course, does permit movement of the sheath 28 in a direction longitudinally thereof away from the abutment means 37. Under similar conditions the sheath and cable assemblies of certain prior art devices are particularly susceptible to disengagement from their anchoring devices with the result that the control system is rendered inoperative.

The present sheath anchor 30 negates this problem. The skewed slot 35 restrains the cable 25 against exit from the slot 38 in the abutment means 37 unless the cable 25 and sheath 28 are correspondingly skewed with respect to the slot 35. This position is illustrated by dotted lines in FIG. 4. Under normal conditions the spring bias on the cable 25, together with its inherent resistance to bending, prevents the cable 25 and sheath 28 from assuming this skewed position. As an added deterent, however, the additional pair of arms 34 generally maintain the alignment of the cable 25 and sheath 28 with the anchor 30 to positively prevent this corresponding skewed relationship of the cable 25, sheath 28 and slot 35. The additional arms 34 also prevent any binding due to misalignment of the cable 25 and anchor 30 during steering movements of the handlebars 14.

In the event of damage to the control system 12 or various related parts of the bicycle 10, it often becomes necessary to remove the sheath 28 from its anchor 30. Under such conditions it is only necessary to grasp the sheath 28 and move it in a direction away from the abutment means 37 until the sheath 28 is no longer embraced by the pairs of arms 33, 34 (see dotted line position of FIG. 4). At this time, the sheath 28 is moved in the direction to pass the cable through the slot 36 and then moved laterally to the dotted line skewed position of FIG. 4 to permit the cable 25 to pass through the skewed slot 35.

FIGS. 7 and 6 illustrate known prior art sheath anchoring devices indicated generally by the numerals 45, 46. Anchor 45 is of a type including a base 47 secureable to the frame 19 of a bicycle, as at 48. Anchor 45 includes an upstanding abutment forming ear 49 having opposed arcuate arms which cooperate to define a circular opening 50. The arms of ear 49 terminate in spaced relation to form an outwardly opening slot 51 through which a cable 25 may enter or exit from the opening 50. A special fitting 52 must be provided for the end of sheath 28 to engage the end of the sheath 28 in the anchor 45. The fitting 52 includes a relatively short reduced end portion 52a which defines a shoulder 52b for engaging the abutment forming ear 49 when the reduced portion 52 is received within the opening 50. This arrangement has its obvious disadvantages in that any slight accidental movement of the sheath 28 in a direction to move the relatively short reduced portion 52 from the opening 50 would permit the accidental exit of the cable 25 through the slot 51.

The anchor member 46 of FIG. 7 merely provides a cup-shaped member for the reception of one end of the sheath 28, the cup-shaped member having an opening 53 in the bottom thereof for the passage of cable 25 therethrough. The cup-shaped member is directly welded to the frame 19 at 54. The anchor 46 prevents the accidental displacement of the cable 25 from the anchor 46 but, in the process, provides a device wherein the cable control system is extremely difficult to remove during periods of repair or replacement.

What is claimed is:

1. A sheath anchor for anchoring one end of the longitudinal sheath of a sheathed cable control system for bicycles, said sheath anchor comprising:
   a. a base having opposed ends;
   b. retainer means on said base for the reception of the cable sheath adjacent each end of said base to limit movement of the sheath transversely of the longitudinal dimensions thereof;
   c. abutment means on said base, said abutment means being axially engageable by one end of the sheath for limiting movement of the sheath in one direction longitudinally thereof;
   d. said abutment means having a slot formed therein for transversely receiving a cable;
   e. said retainer means having slots formed therein for transversely receiving a cable;
   f. one of said slots in said retainer means being skewed with respect to the longitudinal dimension of the cable; and
   g. said one retainer means slot permitting the transverse passage of a cable therefrom only when the sheath is moved in a direction longitudinally thereof out of engagement with said abutment and retainer means, and the cable is skewed correspondingly with said one slot in said retainer means.

2. The structure of claim 1 wherein said base is a generally flat rectangular member having opposite ends and sides, wherein said abutment means is a generally flat extension of said base formed generally at a right angle thereto and wherein said retainer means includes a pair of arcuate arms extending from said base, which arms converge toward each other adjacent one of said base opposed ends to generally embrace said abutment means and terminate in a spaced relationship to form said skewed slot.

3. The structure of claim 2 wherein said slot in said abutment means opens into said skewed slot, wherein said retainer means further includes a corresponding additional pair of arcuate arms extending from said opposite side edges of said base adjacent the other end of said opposed ends, which arms converge towards each other and terminate in a spaced relationship to form a slot for the passage of a cable when the sheath covering the cable is moved out of engagement with said retainer and abutment means.

4. The structure of claim 3 wherein the slot formed by the additional pair of arcuate arms is aligned with the longitudinal dimension of a cable which it retains.

* * * * *